US012624580B1

(12) United States Patent
Knapp

(10) Patent No.: US 12,624,580 B1
(45) Date of Patent: May 12, 2026

(54) CONTAINER LATCHING AND LOCKING ASSEMBLIES

(71) Applicant: Wayne Knapp, Natchitoches, LA (US)

(72) Inventor: Wayne Knapp, Natchitoches, LA (US)

( * ) Notice: Subject to any disclaimer, the term of this patent is extended or adjusted under 35 U.S.C. 154(b) by 253 days.

(21) Appl. No.: 18/411,918

(22) Filed: Jan. 12, 2024

(51) Int. Cl.

| | |
|---|---|
| ***E05C 3/04*** | (2006.01) |
| ***B65D 25/28*** | (2006.01) |
| ***B65D 43/16*** | (2006.01) |
| ***B65D 43/22*** | (2006.01) |
| ***B65D 55/02*** | (2006.01) |
| ***E05C 3/00*** | (2006.01) |
| ***G07C 9/00*** | (2020.01) |
| ***G07C 9/37*** | (2020.01) |

(52) U.S. Cl.
CPC .......... *E05C 3/045* (2013.01); *B65D 25/2897* (2013.01); *B65D 43/163* (2013.01); *B65D 43/22* (2013.01); *B65D 55/02* (2013.01); *E05C 3/004* (2013.01); *B65D 2251/1058* (2013.01); *B65D 2543/00194* (2013.01); *G07C 9/00563* (2013.01); *G07C 9/37* (2020.01)

(58) Field of Classification Search
CPC ..... E05C 3/045; E05C 3/004; B65D 25/2897; B65D 43/163; B65D 43/22; B65D 55/02; B65D 2251/1058; B65D 2543/00194; G07C 9/00563; G07C 9/37
See application file for complete search history.

(56) References Cited

U.S. PATENT DOCUMENTS

| | | | | |
|---|---|---|---|---|
| 4,132,440 | A * | 1/1979 | Johnson | E05B 65/0042 312/215 |
| 5,076,078 | A | 12/1991 | Weger, Jr. | |
| 5,125,697 | A | 6/1992 | Kahl et al. | |
| 5,377,514 | A * | 1/1995 | Robbins | E05G 1/024 312/409 |
| 6,752,092 | B2 * | 6/2004 | Beattie | E05G 1/005 109/74 |
| 6,779,681 | B2 | 8/2004 | Doerfler et al. | |
| 8,740,010 | B1 | 6/2014 | Page | |
| 9,750,371 | B2 | 9/2017 | Bungard et al. | |
| 11,104,484 | B2 | 8/2021 | Slattery | |
| 11,203,465 | B2 | 12/2021 | Seiders et al. | |
| 11,203,473 | B1 | 12/2021 | McGowan | |
| 2011/0186398 | A1 * | 8/2011 | Sheikh | A45C 7/0027 190/103 |
| 2023/0212881 | A1 | 7/2023 | Wang | |

* cited by examiner

*Primary Examiner* — James N Smalley
(74) *Attorney, Agent, or Firm* — R. Keith Harrison

(57) ABSTRACT

Container latching and locking assemblies may include a latch unit configured for attachment to a container lid of a container. A latch element may be provided in the latch unit. A lock unit may be configured for attachment to a container base of the container. A latch and lock device may be provided in the lock unit. The latch and lock device may be selectively configurable in a latching position in which the latch and lock device engages the latch element to latch and lock the container lid in a closed container position on the container base and an unlatching position in which the latch and lock device disengages the latch element to unlock and unlatch the container lid for opening of the container lid to an open container position on the container base.

20 Claims, 12 Drawing Sheets

CONTAINER LATCHING AND LOCKING ASSEMBLIES

FIELD

Illustrative embodiments of the disclosure generally relate to coolers and other containers having a container base and a container lid on the container base. More particularly, illustrative embodiments of the disclosure relate to container latching and locking assemblies which can be fitted onto a cooler or other container to latch and lock the container lid on the container base of the container.

SUMMARY

Illustrative embodiments of the disclosure are generally directed to container latching and locking assemblies suitable for mounting on a container having a container base, a container handle on the container base and a container lid selectively closeable and openable on the container base. An illustrative embodiment of the container latching and locking assemblies may include a latch unit. The latch unit may include a latch unit body configured for attachment to the container lid of the container. A latch cavity may be provided in the latch unit body. A latch element may be provided in the latch cavity. A lock unit may include a lock unit housing configured for attachment to the container base of the container. The lock unit housing of the lock unit may be configured to engage the container handle on the container base. The lock unit housing may have a housing interior. A hasp slot in the lock unit housing may communicate with the housing interior. The hasp slot may normally be disposed in registration or alignment with the latch cavity in the latch unit body of the latch unit. A latch and lock device may be provided in the housing interior. The latch and lock device may include a lock hasp extending from the housing interior through the hasp slot and normally terminating in the latch cavity in the latch unit body of the latch unit. The latch and lock device may be selectively configurable in a latching position in which the lock hasp engages the latch element to latch and lock the container lid in a closed container position on the container base and an unlatching position in which the lock hasp disengages the latch element to unlock and unlatch the container lid for opening of the container lid to an open container position on the container base.

BRIEF DESCRIPTION OF THE DRAWINGS

Illustrative embodiments of the disclosure will now be described, by way of example, with reference to the accompanying drawings, in which.

DETAILED DESCRIPTION

Figure 1:
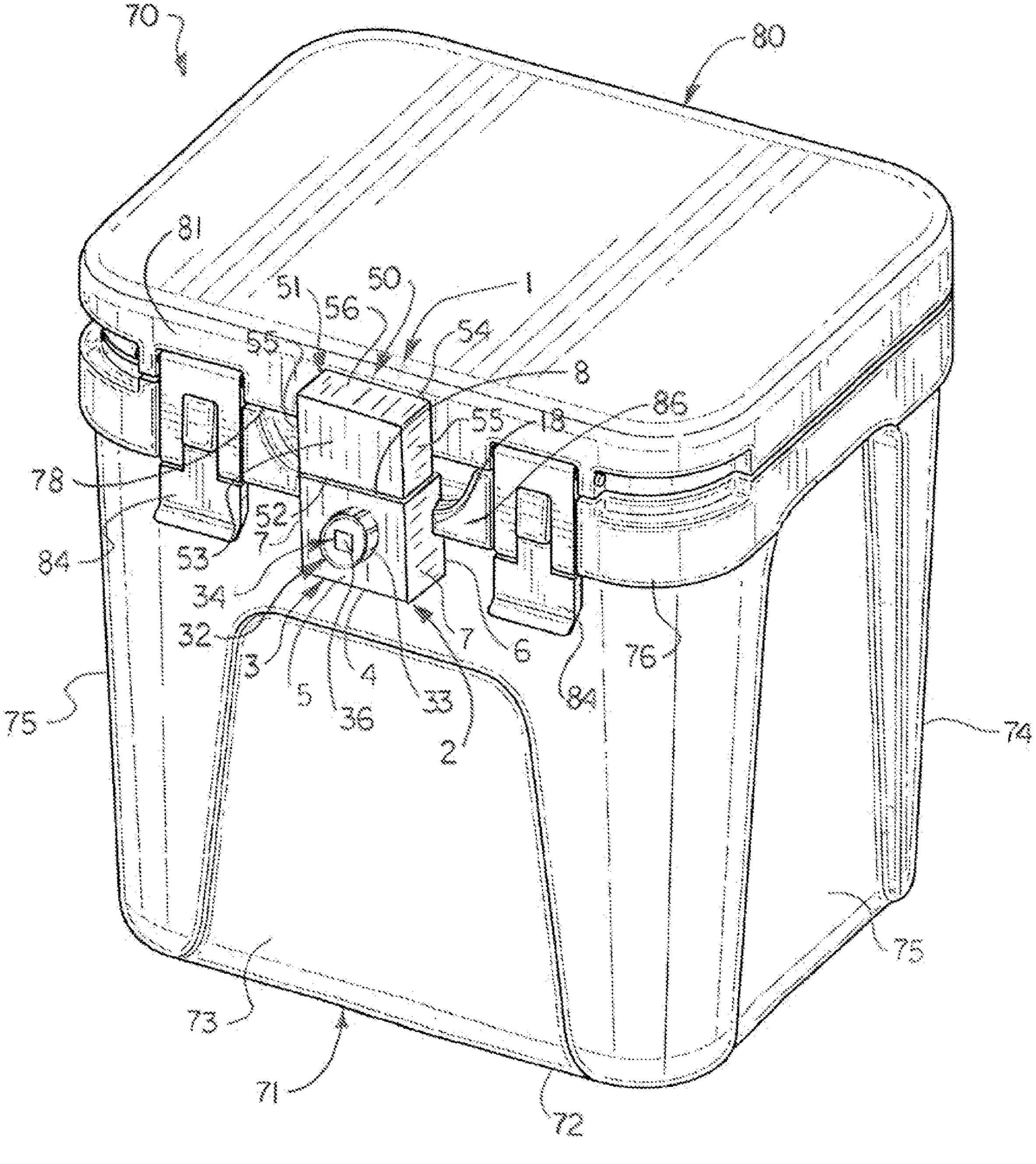
FIG. 1 is a front perspective view of an illustrative embodiment of the container latching and locking assemblies, deployed in place on a container and latching and locking a container lid in a closed container position on a container base of the container in typical application of the assemblies.

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms “upper”, “lower”, “left”, “rear”, “right”, “front”, “vertical”, “horizontal”, and derivatives thereof shall relate to the subject matter as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

All methods set forth in the present disclosure may be performed in any suitable order of steps unless otherwise indicated herein or contradicted by the rules of logic. The use of any and all examples or exemplary language provided herein is intended to clearly describe the subject matter of the disclosure and is not intended to be limiting on the scope of the subject matter set forth in the claims. No element, step, ingredient, or limitation mentioned or described in the specification shall not be construed as regarding any unclaimed component, step, or limitation to be essential in practicing the claimed subject matter.

Unless expressly or implicitly indicated otherwise, throughout the description and the appended claims, the terms "comprise", "comprising", "comprised of" and the like are to be construed in an inclusive sense as opposed to an exclusive or exhaustive sense, and are equivalent to the phrase, "including but not limited to". Each embodiment disclosed herein can comprise, consist essentially of, or consist of its particular stated element, step, ingredient, or limitation. As used herein, the transition terms "comprise", "comprises", "comprising", "include", "includes", "including", "is", "has", "having" or the like means "includes, but is not limited to, and allows for the inclusion of unspecified elements, steps, ingredients, or limitations, even in major amounts". The transitional phrase "consisting of" excludes any element, step, ingredient, or limitation not specified. The transition phrase "consisting essentially of" shall limit the scope of the embodiment to the specified elements, steps, ingredients, or limitations and to those that do not materially affect the embodiment.

Unless otherwise noted using precise or limiting terminology, all numbers which express quantities of ingredients throughout the specification and claims are to be understood as being approximations of the numerical value cited to express the quantities of those ingredients. As used throughout the specification and claims, the term "about" has the meaning reasonably ascribed to it by a person skilled in the art when used in conjunction with a stated numerical value or range, i.e., denoting from the exact stated value or range to somewhat more or somewhat less than the stated value or range, from a deviation of from 0% with respect to the stated value or range to up to and including 20% of the stated value or range in either direction.

Various illustrative embodiments of the disclosure are described herein. Variations on the described illustrative embodiments may become apparent to those of ordinary skill in the art in reading the specification, drawings and claims of the disclosure. Accordingly, the disclosure encompassed by the specification, claims and drawings includes all modifications and equivalents of the subject matter recited in the claims as permitted by applicable law. Additionally, any combination of the elements in all possible variations thereof is encompassed by the subject matter of the disclosure unless otherwise indicated herein.

Figure 2:
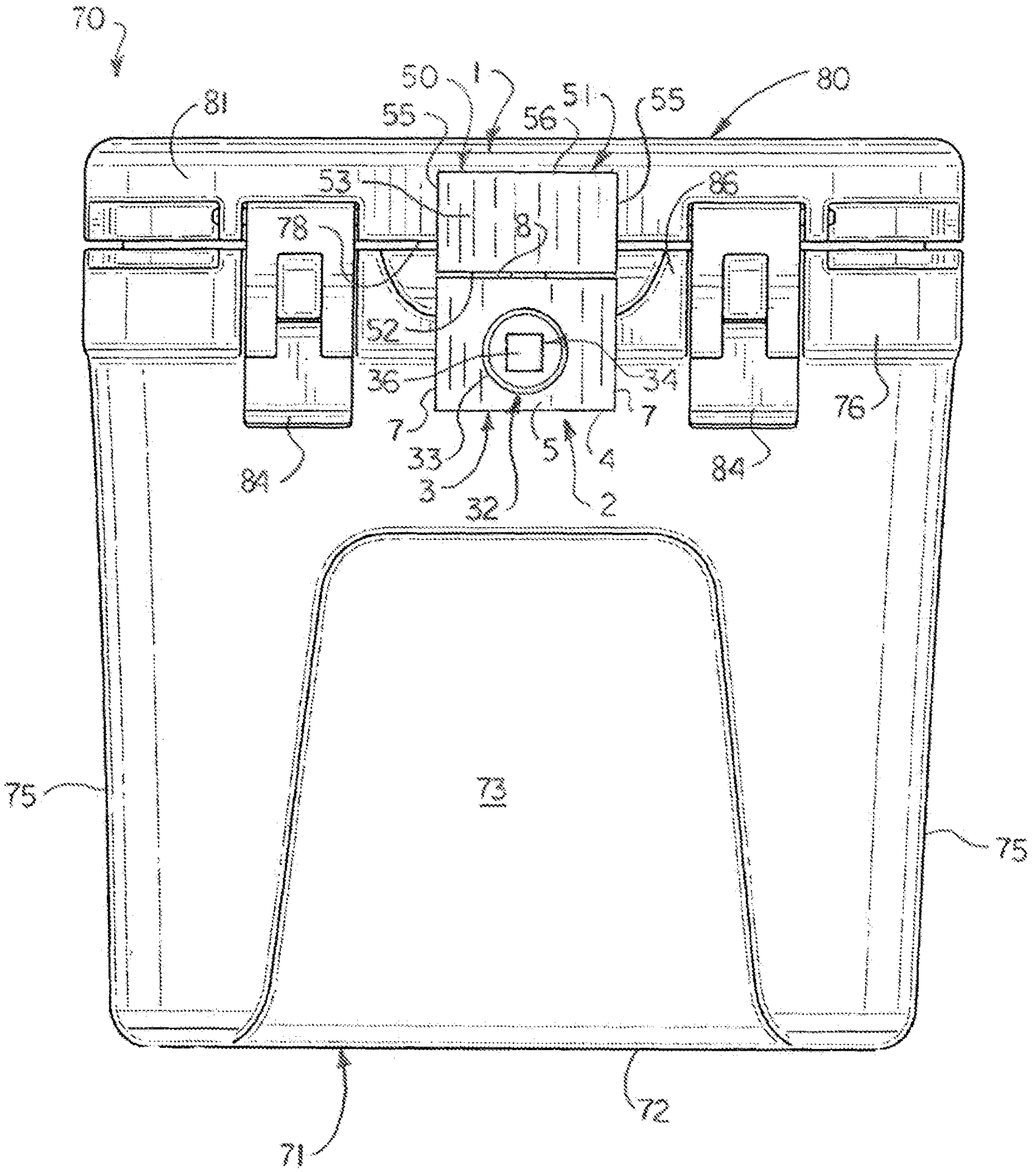
FIG. 2 is a front view of the illustrative container latching and locking assembly deployed on the container illustrated in FIG. 1.
Figure 3:
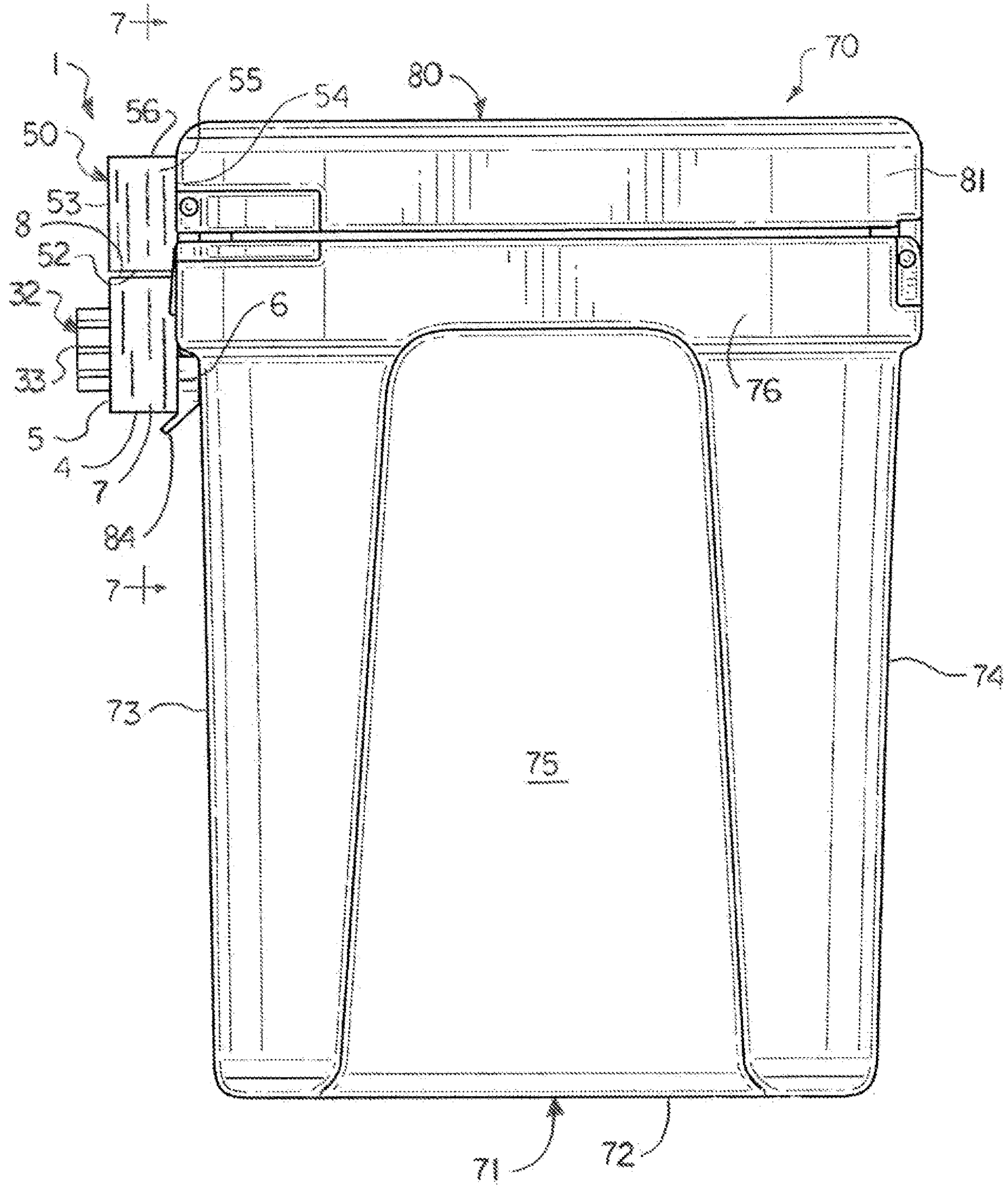
FIG. 3 is a left side view of the illustrative latching and locking assembly on the container.
Figure 4:
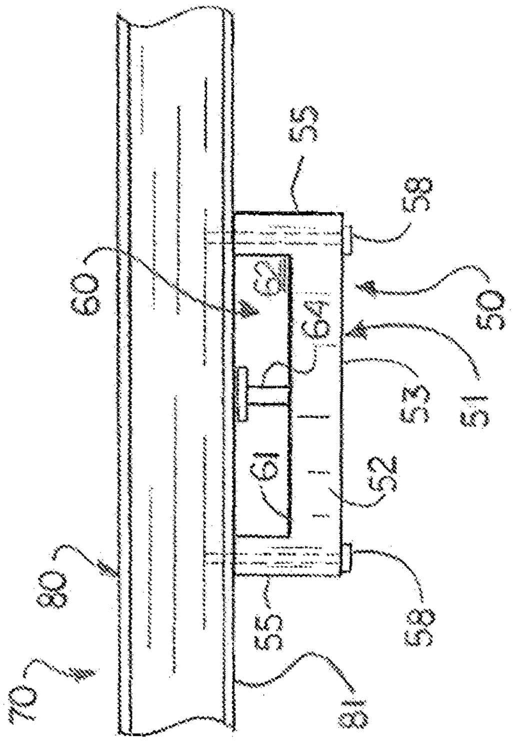
FIG. 4 is an enlarged sectioned bottom view of a front portion of a container lid rim on the container lid of the container, with a typical latch unit of the container latching and locking assemblies shown in bottom view and mounted on the container lid rim.
Figure 5:
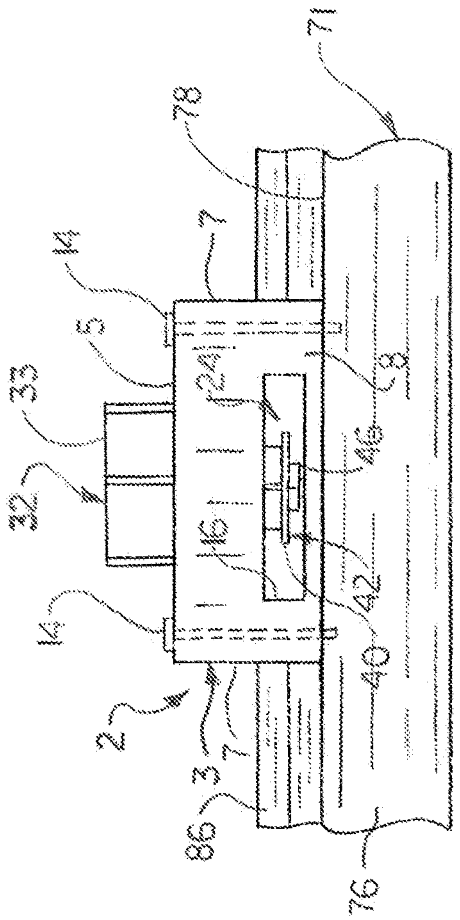
FIG. 5 is a top view of a front portion of a container base rim on the container base of the container, with a typical lock unit of the container latching and locking assemblies shown in top view and mounted on the container lid rim.

Referring to the drawings, an illustrative embodiment of the container latching and locking assembly, hereinafter assembly, is generally indicated by reference numeral 1. As illustrated in FIGS. 1-3, the assembly 1 may be suitable for mounting on a container 70 such as a cooler, for example and without limitation. The container 70 may have a container base 71, a container handle 86 on the container base 71 and a container lid 80 selectively closeable and openable on the container base 71. As will be hereinafter described, the assembly 1 may be configured to selectively latch and lock the container lid 80 on the container base 71 of the container 70 to prevent unauthorized access to the container 70. The assembly 1 may be configured to be selectively unlocked and unlatched to facilitate opening of the container lid 80 on the container base 71 for authorized access to the container 70.

Figure 10:
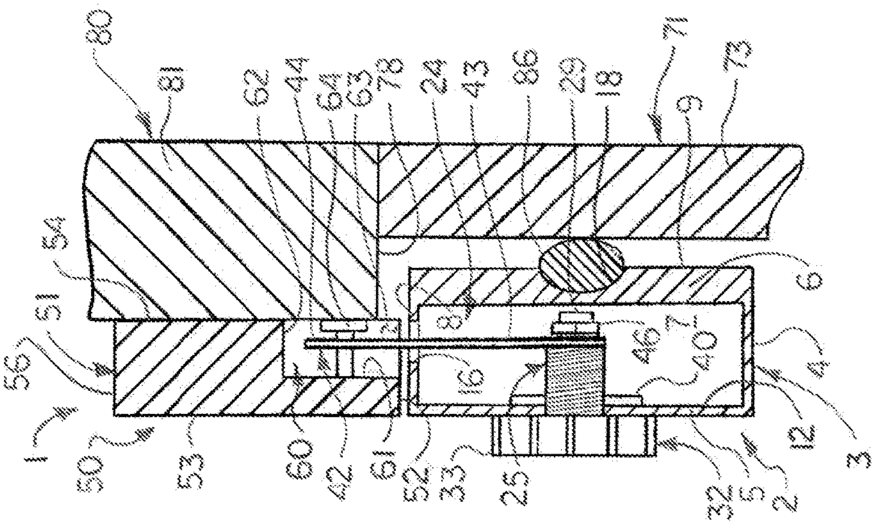
FIG. 10 is a sectional view, taken along section lines 10-10 in FIG. 6, with the container lid closed on the container base of the container and the latch unit latched and locked to the lock unit of the container latching and locking assembly.

As illustrated in FIGS. 1-3, the assembly 1 may include a latch unit 50. The latch unit 50 may include a latch unit body 51. The latch unit body 51 may be configured for attachment to the container lid 80 of the container 70. As illustrated in FIG. 10, a latch cavity 60 may be provided in the latch unit body 51. A latch element 64 may be provided in the latch cavity 60.

The assembly 1 may include a lock unit 2. The lock unit 2 may include a lock unit housing 3. The lock unit housing 3 may be configured for attachment to the container base 71 of the container 70 beneath the latch unit 50, typically as will be hereinafter described. In mounting of the lock unit 2 on the container base 71, the lock unit housing 3 of the lock unit 2 may further be configured to engage the container handle 86 on the container base 71 of the container 70.

As further illustrated in FIG. 10, the lock unit housing 3 may have a housing interior 12. A hasp slot 16 which communicates with the housing interior 12 may be provided in the lock unit housing 3. The hasp slot 16 may normally be disposed in registration or alignment with the latch cavity 60 in the latch unit body 51 of the latch unit 50. As used herein, the term "normally" denotes the condition which is fulfilled when the container lid 80 is closed on the container base 71 of the container 70.

With continued reference to FIG. 10, a latch and lock device 24 may be provided in the housing interior 12 of the lock unit housing 3. The latch and lock device 24 may include a lock hasp 42 which extends from the housing interior 12 through the hasp slot 16. The lock hasp 42 may normally terminate in the latch cavity 60 in the latch unit body 51 of the latch unit 50. The latch and lock device 24 may be selectively configurable in a latching position (FIGS. 7 and 8) in which the lock hasp 42 engages the latch element 64 and an unlatching position (FIG. 9) in which the lock hasp 42 disengages the latch element 64 in the latch cavity 60.

As illustrated in FIGS. 10-13, a handle channel 18 may be provided in the lock unit housing 3 of the lock unit 2. The handle channel 18 may be sized and configured to engage or receive and accommodate the container handle 86 of the container 70 in deployment of the assembly 1 on the container 70, typically as will be hereinafter described.

The lock unit housing 3 of the lock unit 2 may include a lower housing portion 4. A front housing portion 5 and a rear housing portion 6 may extend from the lower housing portion 4 in spaced-apart relationship to each other. As illustrated in FIG. 10, in deployment of the assembly 1 on the container 70, the front housing portion 5 of the lock unit housing 3 may be disposed away from and the rear housing portion 6 may be disposed toward the container base 71. A pair of side housing portions 7 may extend from the lower housing portion 4 in spaced-apart relationship to each other between the front housing portion 5 and the rear housing portion 6. An upper housing portion 8 may be provided on the front housing portion 5, the rear housing portion 6 and the side housing portions 7. The housing interior 12 may be formed by and between the lower housing portion 4, the front housing portion 5, the rear housing portion 6, the side housing portions 7 and the upper housing portion 8. The hasp slot 16 may extend from the housing interior 12 through the upper housing portion 8.

The lock unit housing 3 of the lock unit 2 may include plastic, metal, wood, composite materials, combinations thereof, and/or other suitable material or materials. Each of the lower housing portion 4, the front housing portion 5, the rear housing portion 6, the side housing portions 7 and the upper housing portion 8 may include a panel or plate which may be fabricated separately from each other and assembled to form the lock unit housing 3. Alternatively, the lock unit housing 3 may have a unitary construction with the lower housing portion 4, the front housing portion 5, the rear housing portion 6, the side housing portions 7, the upper housing portion 8, the housing interior 12 and the hasp slot 16 casted, molded, 3D printed and/or machined from a single piece of material typically according to the knowledge of those skilled in the art.

Figure 12:
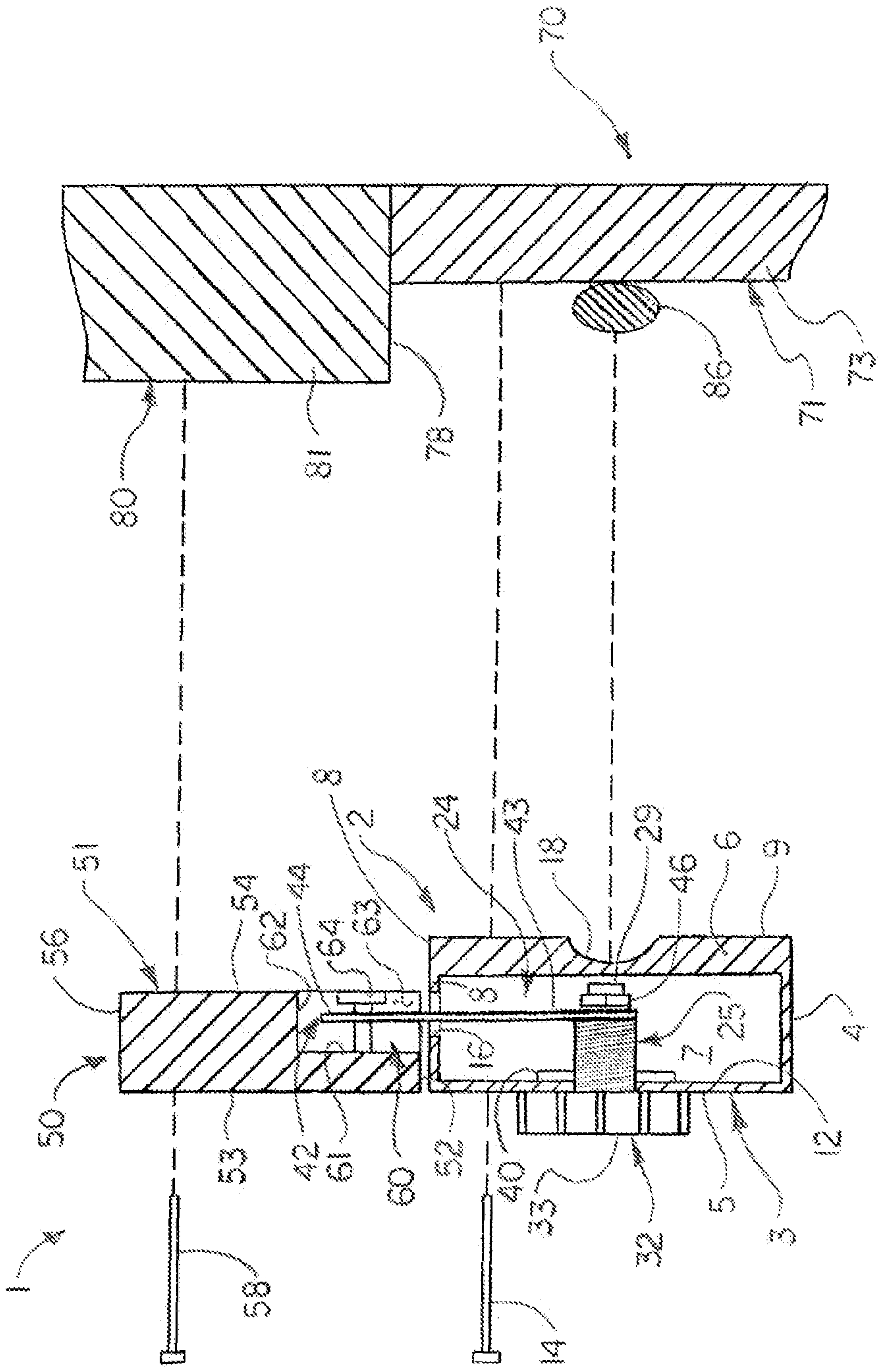
FIG. 12 is an exploded view of the sectional view of the container latching and locking assembly taken along section lines 10-10 in FIG. 6, more particularly illustrating a typical fastener technique for attachment of the lock unit of the assembly to the container base and the latch unit of the assembly to the container lid of the container.
Figure 13:
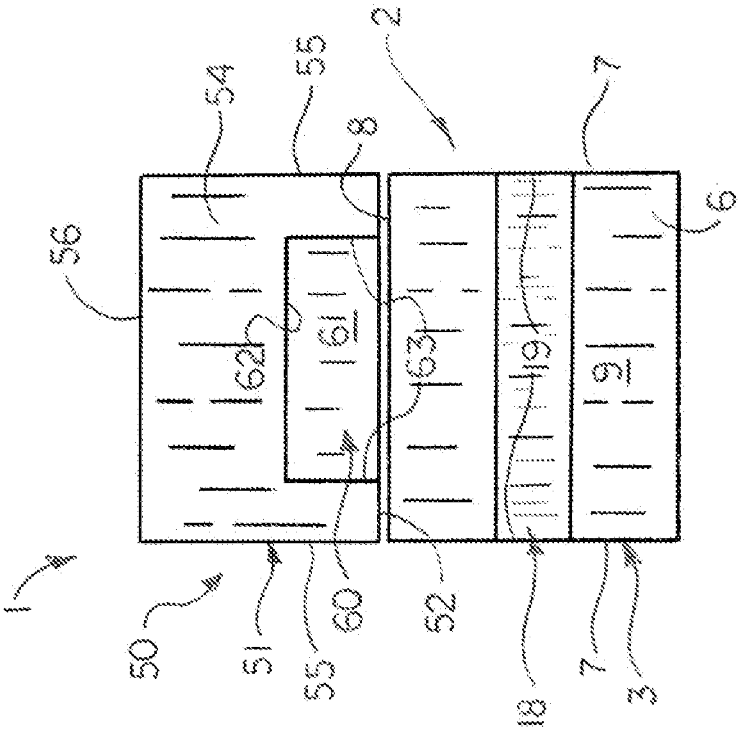
FIG. 13 is a rear view of the illustrative container latching and locking assembly.

As further illustrated in FIGS. 10-13, the rear housing portion 6 of the latch unit housing 3 may have a rear housing surface 9. The handle channel 18 may be provided in the rear housing surface 9. As illustrated in FIG. 13, the handle channel 18 may have a pair of handle channel ends 19 which may open at the respective side housing portions 7 of the lock unit housing 3.

Figure 14:
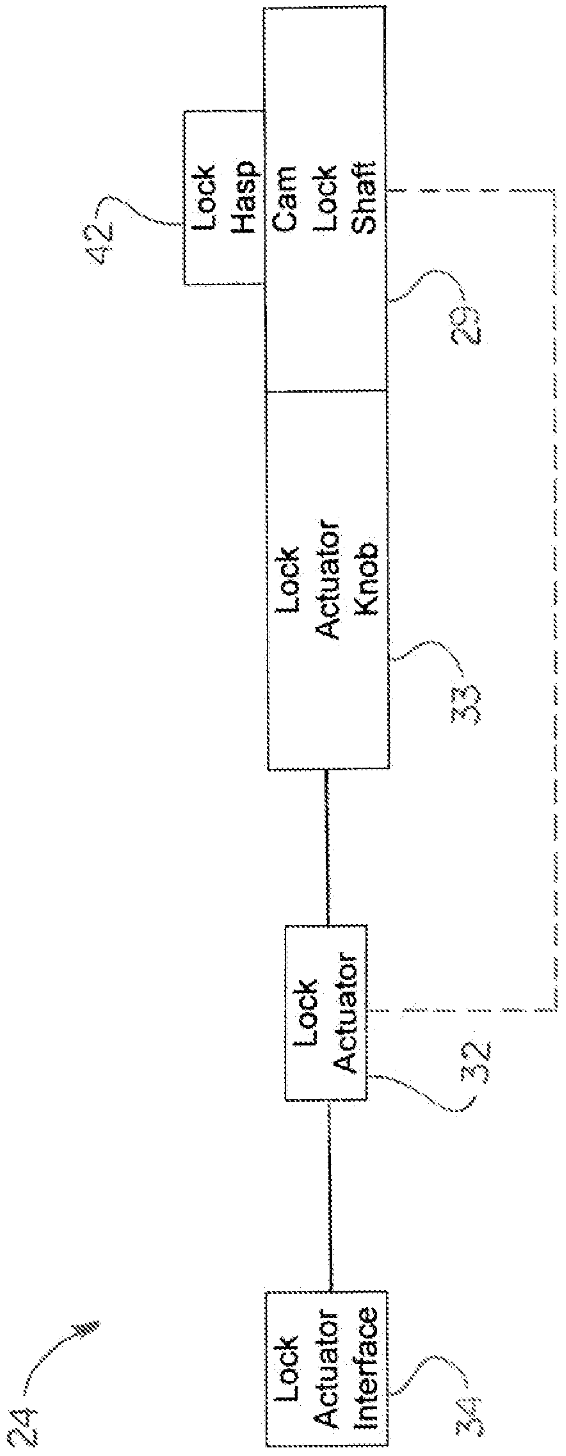
FIG. 14 is a block diagram of a typical latch and lock device suitable for implementation of the container latching and locking assembly.
Figure 15:
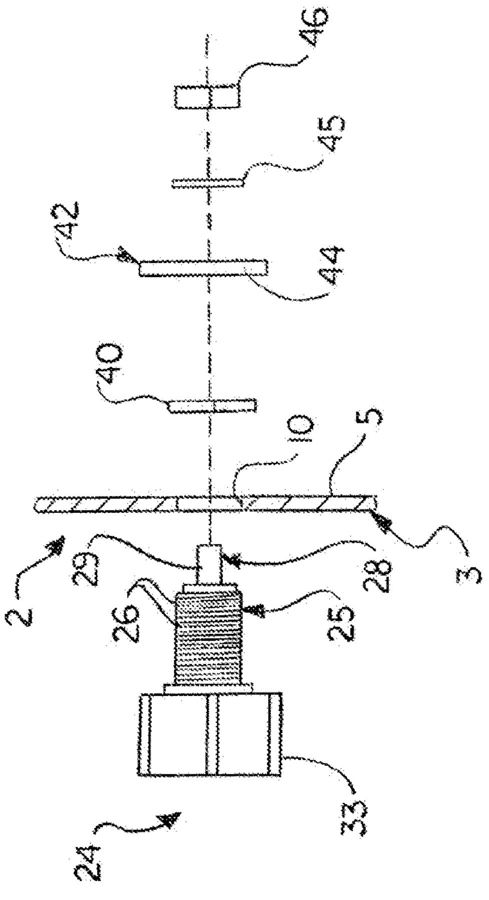
FIG. 15 is an exploded side view of a typical latch and lock device of an illustrative embodiment of the container latching and locking assemblies, more particularly illustrating installation of the latch and lock device in the lock unit.
Figure 16:
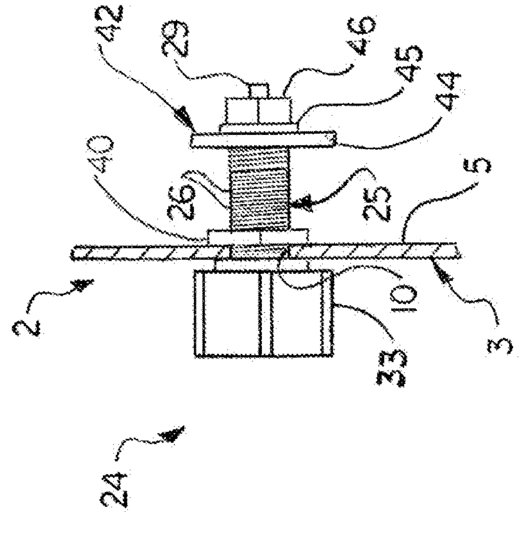
FIG. 16 is a side view of the latch and lock device illustrated in FIG. 13, installed in the lock unit.

The latch and lock device 24 of the lock unit 2 may have any design which is suitable for locking the container lid 80 in a closed container position on the container base 71 of the container 70 by latching and locking the latch unit 50 to the lock unit 2. As illustrated in FIGS. 14-16, in some embodiments, the latch and lock device 24 may include a cam lock shaft 29 which engages the lock hasp 42. The cam lock shaft 29 may be selectively deployable in the latching position (FIGS. 7 and 8) and the unlatching position (FIG. 9). As further illustrated in FIG. 14, a lock actuator 32 may engage the cam lock shaft 29. In a locked configuration, the lock actuator 32 may be configured to lock the cam lock shaft 29 in the latching position and unlock the cam lock shaft 29 in an unlocked configuration of the lock actuator 32. A lock actuator interface 34 may interface with the lock actuator 32. The lock actuator interface 34 may be configured to facilitate selective release of the lock actuator 32 from the locked configuration to the unlocked configuration. In some embodiments, a lock actuator knob 33 may engage the cam lock shaft 29 for selective rotation of the cam lock shaft 29 between the latching position and the unlatching position in the unlocked configuration of the lock actuator 32. In some embodiments, the lock actuator interface 34 may include a key-actuated interface and/or a combination lock interface, for example and without limitation.

Figure 6:
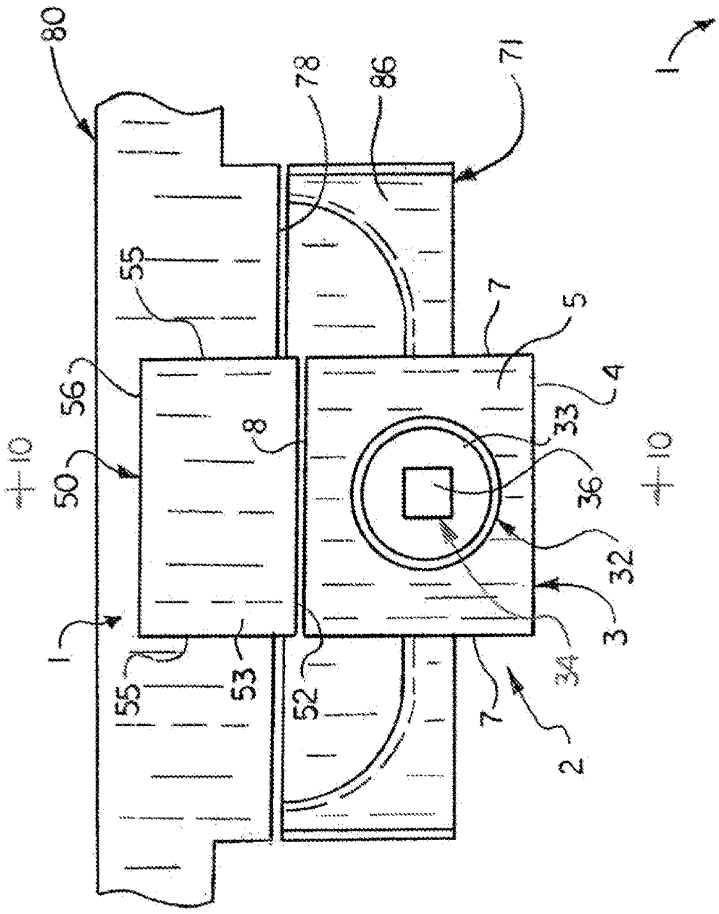
FIG. 6 is an enlarged front view of the lock unit and the latch unit of the illustrative assembly mounted to the container base and the container lid, respectively, of the container, with the container lid in the closed container position on the container base and the latch unit latched and locked to the lock unit.

In some embodiments, the lock actuator interface 34 may include at least one biometric lock actuator interface. As used herein, "biometric" includes but is not limited to any measurable physical characteristic or personal behavioral trait or combination thereof which may be used to recognize the identity or verify the claimed identity of a user of the assembly 1. The biometric lock actuator interface 34 may include at least one of the following: a facial image scan interface, a fingerprint scan interface and an iris scan interface. For example and without limitation, as illustrated in FIGS. 6, 8 and 9, in some embodiments, the biometric lock actuator interface 34 may include a fingerprint scan interface having a fingerprint sensor 36 on the lock actuator knob 32. A non-limiting example of a commercially available latch and lock device 24 having a fingerprint scan interface with the fingerprint sensor 36 on the lock actuator knob 32 is the POTHUNDER™ fingerprint cabinet lock which can be obtained from Amazon (www.amazon.com).

As illustrated in FIGS. 15 and 16, the cam lock shaft 29 may be rotatably disposed in a cam lock housing 25 which may have exterior housing threads 26. In the locked configuration, the lock actuator 32 (FIG. 14) may be configured to lock the cam lock shaft 29 and/or the lock actuator knob 33 in a stationary position with respect to the cam lock housing 25. In the unlocked configuration, the lock actuator 32 (FIG. 14) may be configured to unlock the cam lock shaft 29 and/or the lock actuator knob 33 with respect to the cam lock housing 25 to facilitate rotation of the cam lock shaft 29 between the latching position and the unlatching position. A lock opening 10 may extend through the front housing portion 5 of the lock unit housing 3 of the lock unit 2. Accordingly, in typical installation of the latch and lock device 24, the cam lock housing 25 may be inserted through the lock opening 10. A lock nut 40 may be threaded on the exterior housing threads 26 on the cam lock housing 25 and tightened against the interior surface of the front housing portion 5 of the lock unit housing 3, as illustrated in FIG. 16, to secure the cam lock housing 25 in the lock opening 10. The lock hasp 42 may be placed on the protruding end portion of the cam lock shaft 29 and secured thereon via a washer 45 and a securing nut 46.

Figure 7:
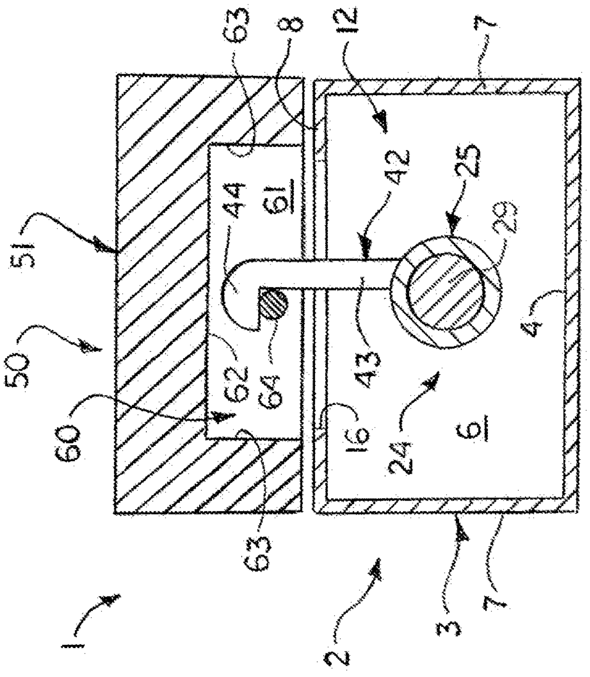
FIG. 7 is a sectional view, taken along section lines 7-7 in FIG. 3, of the latch unit latched and locked to the lock unit of the illustrative container latching and locking assembly.
Figure 8:
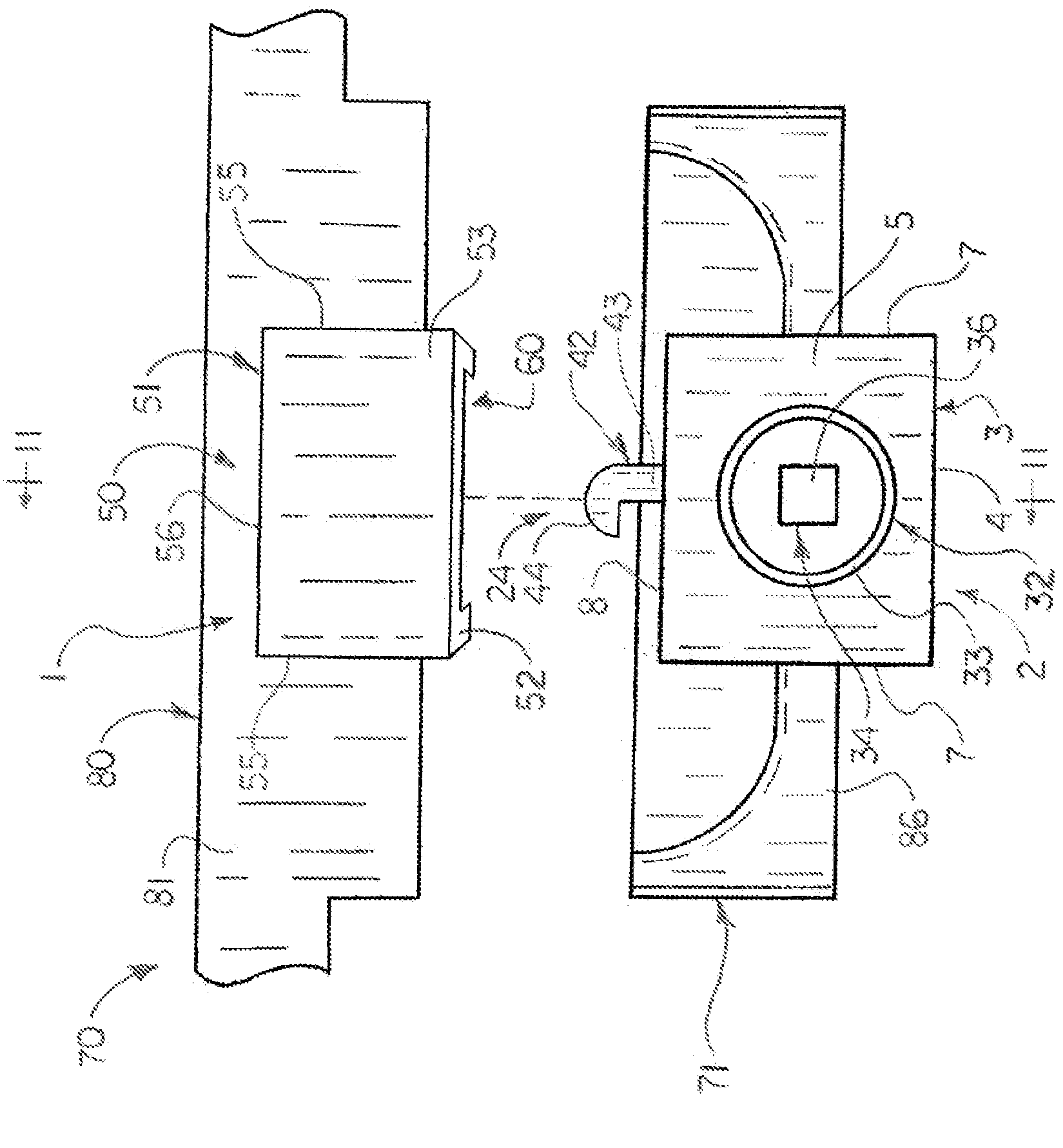
FIG. 8 is an enlarged front view of the latch unit unlocked and unlatched from the lock unit of the assembly and the container lid slightly opened on the container base of the container, with the lock knob and the lock hasp of the latch and lock device rotated to a latching position.
Figure 9:
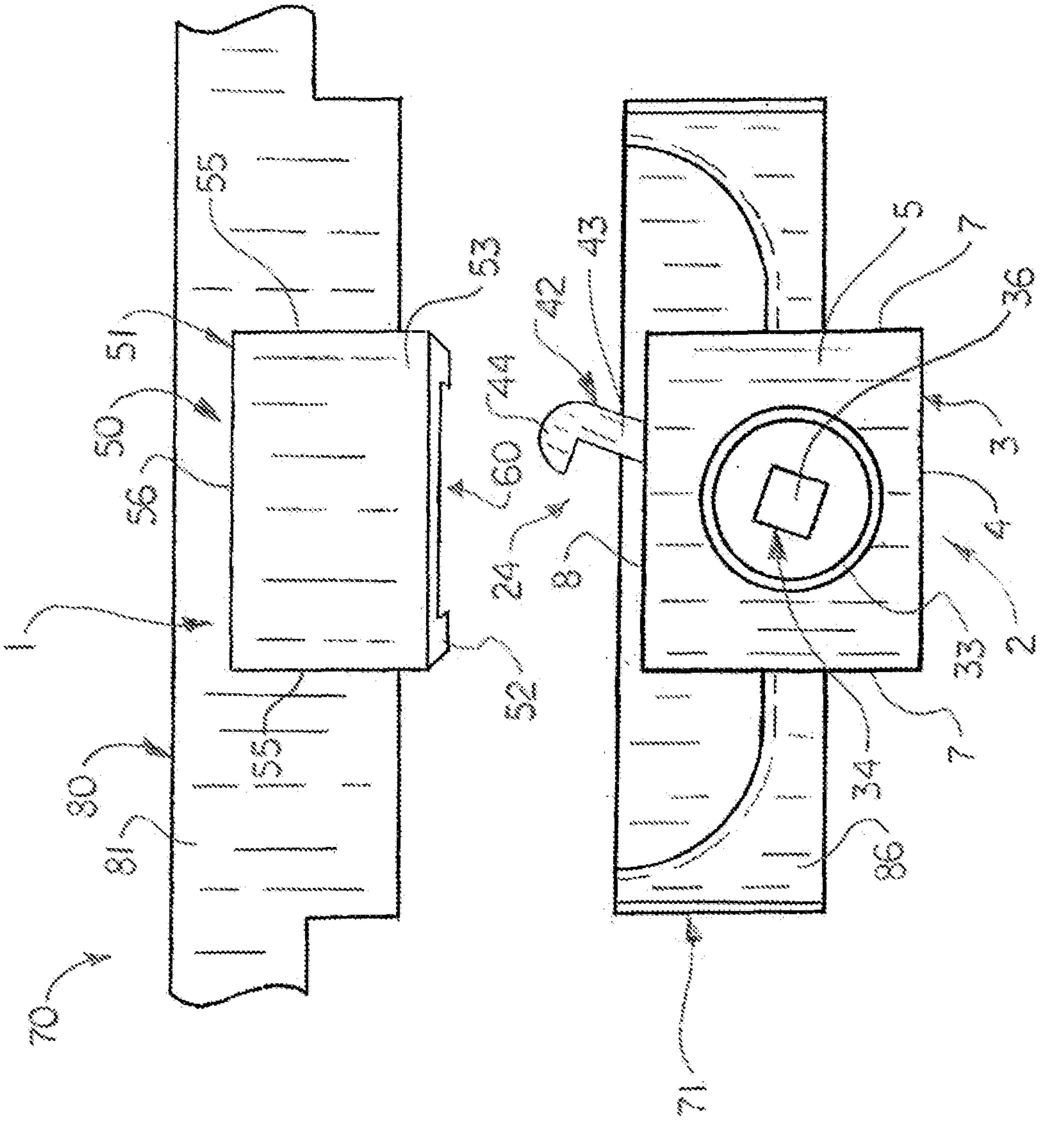
FIG. 9 is an enlarged front view of the latch unit and the lock unit as illustrated in FIG. 8, with the lock knob and the lock hasp of the latch and lock device rotated to an unlatching position.
Figure 11:
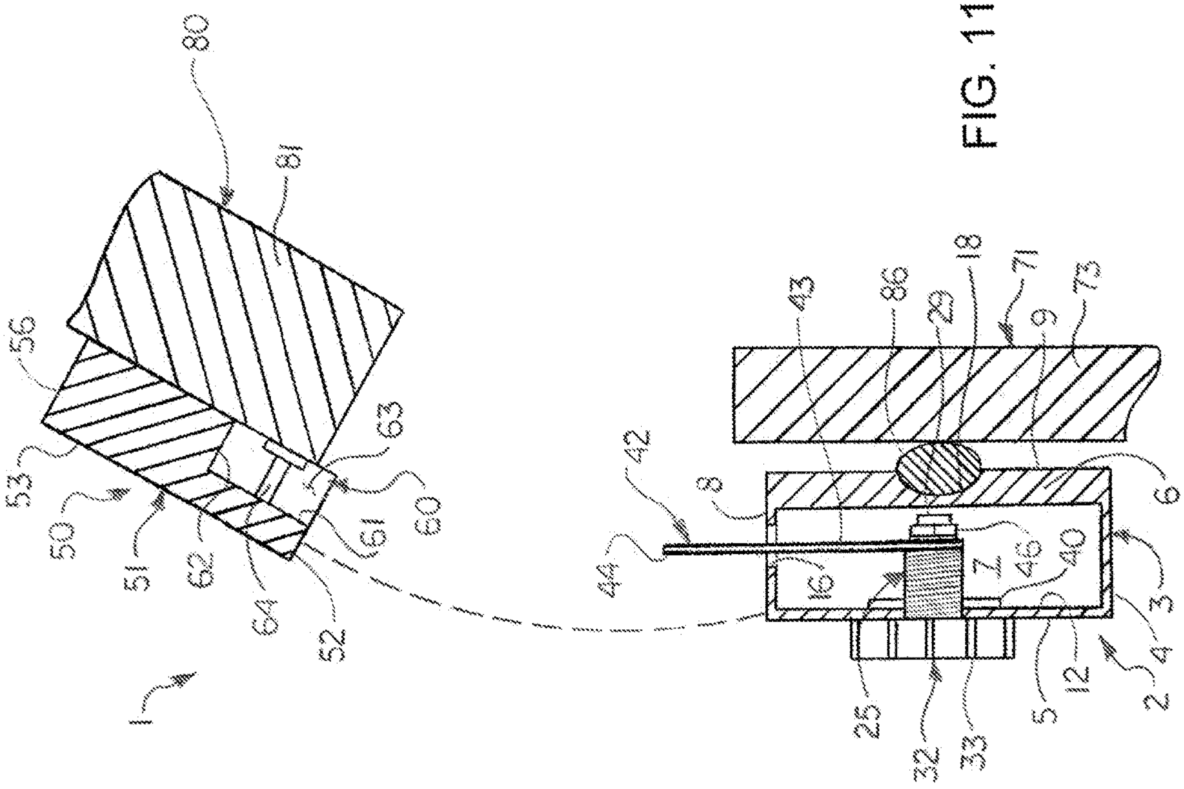
FIG. 11 is a sectional view, taken along section lines 11-11 in FIG. 8, with the latch unit unlocked and unlatched from the lock unit and the container lid opened on the container base of the container.

As illustrated in FIGS. 7-9, the lock hasp 42 of the latch and lock device 24 may include an elongated lock hasp shaft 43. The lock hasp shaft 43 may extend from the housing interior 12 of the lock unit housing 3 through the hasp slot 16. A lock hasp hook portion 44 may terminate the lock hasp shaft 43 in the latch cavity 60 of the latch unit 50. A shaft opening (not illustrated) which receives the cam lock shaft 29 (FIG. 15) may extend through the lock hasp shaft 43 at the end of the lock hasp shaft 43 which is opposite the lock hasp hook portion 44. Accordingly, in the latching position of the cam lock shaft 29, as illustrated in FIG. 7, the lock hasp hook portion 44 may engage the latch element 64 in the latch cavity 60 of the latch unit 50. In the unlatching position of the cam lock shaft 29 (FIG. 9), the lock hasp hook portion 44 may disengage the latch element 64 to facilitate disengagement of the latch unit 50 from the lock unit 2 and deployment of the container lid 80 from the closed container position (FIG. 6) to an open container position (FIGS. 8 and 9) on the container base 71.

As illustrated in FIG. 1, the latch unit body 51 of the latch unit 50 may include a lower body surface 52, a front body surface 53 and a spaced-apart rear body surface 54 extending from the lower body surface 52, a pair of spaced-apart side body surfaces 55 extending between the front body surface 53 and the rear body surface 54 and an upper body surface 56 opposite the lower body surface 52. In deployment of the assembly 1 on the container 70, the front body surface 53 may be oriented away from the container lid 80 and the rear body surface 54 may be oriented toward the container lid 80 of the container 70. The lower body surface 52 may normally be disposed adjacent to the lock unit housing 3 of the lock unit 2.

As illustrated in FIG. 10, in some embodiments, the latch cavity 60 may be formed in or open to the lower body surface 52 and the rear body surface 54 of the latch unit body 51. The latch cavity 60 may have a front cavity surface 61 which may be recessed from and parallel to the rear body surface 54 of the latch unit body 51. An upper cavity surface 62 and a pair of spaced-apart side cavity surfaces 63 may extend rearwardly from the front cavity surface 61. The latch element 64 may extend from the front cavity surface 61 into the latch cavity 60, typically parallel and adjacent to the upper cavity surface 62 and the side cavity surfaces 63.

The latch unit body 51 of the latch unit 50 may include plastic, metal, wood, composite materials, combinations thereof, and/or other suitable material or materials. Each of the lower body surface 52, the front body surface 53, the rear body surface 54, the side body surfaces 55 and the upper body surface 56 may include a panel or plate which may be fabricated separately from each other and assembled to form the latch unit body 51. Alternatively, the latch unit body 51 may have a unitary construction with the lower body surface 52, the front body surface 53, the rear body surface 54, the side body surfaces 55, the upper body surface 56 and the latch cavity 60 casted, molded, 3D printed and/or machined from a single piece of material typically according to the knowledge of those skilled in the art.

As illustrated in FIG. 12, at least one lock unit fastener 14 may be configured to attach the lock unit housing 3 of the lock unit 2 to the container base 71 of the container 70. Similarly, at least one latch unit fastener 58 may be configured to attach the latch unit body 51 of the latch unit 50 to the container lid 80 of the container 70. The lock unit fastener or fasteners 14 and the latch unit fastener or fasteners 58 may include any device, element, component or combination thereof which is suitable for the purpose. For example and without limitation, in some embodiments, the lock unit fastener(s) 14 and/or the latch unit fastener(s) 58 may include at least one bolt, at least one bracket, one or more interfacing slide flanges, at least one rivet or combinations thereof.

In typical application, the assembly 1 may be mounted on the container 70 to enable a user to selectively latch and lock the container lid 80 in the closed container position on the container base 71 of the container 70. The container 70 may include any type of cooler, ice chest, container or enclosure which may be used to store food, beverages and/or other items in a secure manner. For example and without limitation, in some applications, the container 70 may be a commercially available YETI™ cooler. As illustrated in FIGS. 1-3, the container 70 may include the container base 71 and the container lid 80 which may be hinged or removable with respect to the container base 71. The container base 71 may include a container base bottom 72, a container base front 73, a container base rear 74 and a pair of container base sides 75. A container base rim 76 may extend along the upper edge of the container base front 73, the container base rear 74 and the container base sides 75. The container lid 80 may include a container lid rim 81 which engages with the container base rim 76 on the container base 71 in the closed container position of the container lid 80. A pair of spaced-apart container latches 84 may be selectively deployable to lock or secure the container lid 80 on the container base rim 76 of the container base 71. An elongated handle cavity 78 may be provided in the container base rim 76 between the container latches 84 and beneath the container lid rim 81 of the container lid 80. The container handle 86 may be mounted in the handle cavity 78.

The lock unit 2 of the assembly 1 may be mounted to the container base 71 of the container 70 by initially placing the handle channel 18 in the rear housing surface 9 of the rear housing portion 6 on the lock unit housing 3 into engagement with the container handle 86, as illustrated in FIG. 12. Accordingly, as illustrated in FIG. 10, the rear housing surface 9 may be disposed in spaced-apart, parallel relationship to the container base front 73 of the container base 71 with the upper housing portion 8 of the lock unit housing 3 typically beneath the overhang of the container lid rim 81 projecting beyond the container base front 73 at the handle cavity 78. As illustrated in FIG. 12, the lock unit fastener(s) 14 may next be deployed to attach or secure the lock unit housing 3 to the container base front 73. The lock actuator interface 34 (FIG. 14) of the latch and lock device 24 may be operated to deploy the lock actuator 32 in the unlocked configuration and the lock actuator knob 33 manipulated to rotate the cam lock shaft 29 from the latching position (FIGS. 7 and 8) to the unlatching position (FIG. 9). It will be appreciated by those skilled in the art that the engagement of the container handle 86 of the container 70 with the handle channel 18 in the lock unit housing 3 of the lock unit 2 may stabilize and secure the lock unit 2 with respect to the container base 71, particularly in the latched and locked configuration of the assembly 1.

The latch unit 50 of the assembly 1 may be mounted to the container lid 80 of the container 70 by initially placing the rear body surface 54 of the latch unit body 51 flat against the container lid rim 81 of the container lid 80 above the latch unit 2. As illustrated in FIG. 10, the latch cavity 60 in the latch unit body 51 of the latch unit 50 may be disposed above and in registration and communication with the underlying hasp slot 16 in the upper housing portion 8 of the lock unit housing 3. With the container lid 80 typically in the closed container position, the latch unit body 51 may be lowered until the lock hasp hook portion 44 on the lock hasp shaft 43 of the lock hasp 42 inserts upwardly into the latch cavity 60. As illustrated in FIG. 12, the latch unit fastener(s) 58 may next be deployed to attach or secure the latch unit body 51 to the container lid rim 81. The lock actuator knob 33 of the latch and lock device 24 may be manipulated to rotate the cam lock shaft 29 from the unlatching position (FIG. 9) to the latching position (FIGS. 7 and 8) to facilitate engagement of the lock hasp hook portion 44 with the latch element 64, as illustrated in FIG. 7. The lock actuator interface 34 may be operated to deploy the lock actuator 32 (FIG. 14) in the locked configuration.

In an alternative installation method, the latch unit 50 may be attached to the container lid 80 as the container lid 80 remains in the open container position. The container lid 80 may then be lowered to the closed container position onto the container base 71 as the lock hasp hook portion 44 of the lock hasp 42 inserts into the latch cavity 60.

When it is desired to place and secure one or more items in the container 70 and prevent unauthorized access to the interior of the container 70, the lock actuator interface 34 of the latch and lock device 24 may initially be manipulated to deploy the lock actuator 32 from the locked configuration to the unlocked configuration. In some embodiments, this may be accomplished by having a dedicated user of the assembly 1 place a finger against the fingerprint sensor 36 on the lock actuator knob 33. This action may cause the lock actuator 32 to disengage the cam lock shaft 29 and/or the lock actuator knob 33 such that the cam lock shaft 29 is rotatable in the cam lock housing 25 typically by rotation of the lock actuator knob 33. The lock actuator knob 33 may then be rotated to rotate the cam lock shaft 29 and the lock hasp 42 from the latching position to the unlatching position to disengage the lock hasp hook portion 44 of the lock hasp 42 from the latch element 64 in the latch cavity 60 of the latch unit 50. Accordingly, the latch unit 50 is unlocked and unlatched from the lock unit 2, thereby facilitating deployment of the container lid 80 from the closed container position to the open container position on the container base 71. The item(s) may then be placed into the interior of the container base 71, after which the container lid 80 may be returned to the closed container position on the container base 71. The lock actuator knob 33 may be rotated to return the cam lock shaft 29 and the lock hasp 42 to the latching position such that the lock hasp hook portion 44 of the lock hasp 42 again engages the latch element 64, as illustrated in FIG. 7. The lock actuator interface 34 may again be operated to deploy the lock actuator 32 in the locked configuration. To facilitate retrieval of the item(s) from the container 70, the latch unit 50 may subsequently be unlocked and unlatched from the latch unit 2 to facilitate opening of the container lid 80 on the container base 71 typically as was heretofore described.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A container latching and locking assembly suitable for mounting on a container having a container base, a container handle on the container base and a container lid selectively closeable and openable on the container base, the container latching and locking assembly comprising:
- a latch unit comprising:
  - a latch unit body configured for attachment to the container lid of the container;
  - a latch cavity in the latch unit body; and
  - a latch element in the latch cavity; and
- a lock unit comprising:
  - a lock unit housing configured for attachment to the container base of the container, the lock unit housing configured to engage the container handle on the container base;
  - a housing interior in the lock unit housing; and
  - a hasp slot in the lock unit housing and communicating with the housing interior, the hasp slot normally disposed in registration or alignment with the latch cavity in the latch unit body of the latch unit;
- a latch and lock device in the housing interior, the latch and lock device comprising a lock hasp extending from the housing interior through the hasp slot and normally terminating in the latch cavity, the latch and lock device selectively configurable in a latching position wherein the lock hasp engages the latch element and an unlatching position wherein the lock hasp disengages the latch element;
- at least one latch unit fastener configured to attach the latch unit body of the latch unit to the container lid of the container;
- at least one lock unit fastener configured to attach the lock unit housing of the lock unit to the container base of the container; and
- wherein at least one of the at least one latch unit fastener and the at least one lock unit fastener comprises at least one bolt, at least one bracket, interfacing slide flanges, at least one rivet or any combination thereof.

2. The container latching and locking assembly of claim 1 further comprising a handle channel in the lock unit housing of the lock unit, the handle channel sized and configured to receive and accommodate the container handle.

3. The container latching and locking assembly of claim 1 wherein the latch unit body of the latch unit comprises a lower body surface adjacent to the lock unit housing of the lock unit, an upper body surface opposite the lower body surface, a front body surface configured to be oriented away from the container lid of the container and a rear body surface configured to be oriented toward the container lid of the container, and wherein the latch cavity is formed in and opens to the lower body surface and the rear body surface.

4. The container latching and locking assembly of claim 3 wherein the latch cavity comprises a front cavity surface recessed from and parallel to the rear body surface of the latch unit body, and wherein the latch element extends from the front cavity surface.

5. The container latching and locking assembly of claim 1 wherein the latch and lock device comprises:
- a cam lock shaft engaging the lock hasp, the cam lock shaft deployable in the latching position and the unlatching position;
- a lock actuator engaging the cam lock shaft, the lock actuator configured to lock the cam lock shaft in the latching position in a locked configuration and unlock the cam lock shaft in an unlocked configuration of the lock actuator; and
- a lock actuator interface interfacing with the lock actuator, the lock actuator interface configured to facilitate selective release of the lock actuator from the locked configuration to the unlocked configuration.

6. The container latching and locking assembly of claim 5 wherein the lock actuator comprises a lock actuator knob engaging the cam lock shaft for selective rotation of the cam lock shaft between the latching position and the unlatching position in the unlocked configuration of the lock actuator.

7. The container latching and locking assembly of claim 5 wherein the lock actuator interface comprises at least one biometric lock actuator interface.

8. The container latching and locking assembly of claim 7 wherein the at least one biometric lock actuator interface comprises at least one of the following: a facial image scan interface, a fingerprint scan interface and an iris scan interface.

9. A container latching and locking assembly suitable for mounting on a container having a container base, a container handle on the container base and a container lid selectively closeable and openable on the container base, the container latching and locking assembly comprising:
- a latch unit comprising:
  - a latch unit body configured for attachment to the container lid of the container;
  - a latch cavity in the latch unit body; and
  - a latch element in the latch cavity;
- a lock unit comprising:
  - a lock unit housing configured for attachment to the container base of the container, the lock unit housing comprising:
    - a lower housing portion;
    - an upper housing portion opposite the lower housing portion, the upper housing portion normally adjacent to the latch unit body of the latch unit;
    - a rear housing portion and a front housing portion spaced-apart to each other and extending from the lower housing portion to the upper housing portion, the rear housing portion configured to be oriented toward the container base and the front housing portion configured to be oriented away from the container base of the container;

a pair of spaced-apart side housing portions extending from the lower housing portion to the upper housing portion between the rear housing portion and the front housing portion;

a rear housing surface on the rear housing portion;

a handle channel in the rear housing surface, the handle channel sized and configured to receive and accommodate the container handle on the container base of the container;

a housing interior in the lock unit housing; and a hasp slot in the upper housing portion, the hasp slot communicating with the housing interior and normally disposed in registration or alignment with the latch cavity in the latch unit body of the latch unit;

a latch and lock device in the housing interior, the latch and lock device comprising a lock hasp extending from the housing interior through the hasp slot and terminating in the latch cavity, the latch and lock device selectively configurable in a latching position wherein the lock hasp engages the latch element and an unlatching position wherein the lock hasp disengages the latch element;

at least one latch unit fastener configured to attach the latch unit body of the latch unit to the container lid of the container;

at least one lock unit fastener configured to attach the lock unit housing of the lock unit to the container base of the container; and wherein at least one of the at least one latch unit fastener and the at least one lock unit fastener comprises at least one bolt, at least one bracket, interfacing slide flanges, at least one rivet or any combination thereof.

10. The container latching and locking assembly of claim 9 wherein the handle channel comprises a pair of handle channel ends opening at the pair of spaced-apart side housing portions, respectively, of the lock unit housing of the lock unit.

11. The container latching and locking assembly of claim 9 wherein the latch unit body of the latch unit comprises a lower body surface normally adjacent to the lock unit housing of the lock unit, an upper body surface opposite the lower body surface, a front body surface configured to be oriented away from the container lid of the container and a rear body surface configured to be oriented toward the container lid of the container, and wherein the latch cavity is formed in and opens to the lower body surface and the rear body surface.

12. The container latching and locking assembly of claim 11 wherein the latch cavity comprises a front cavity surface recessed from and parallel to the rear body surface of the latch unit body, and wherein the latch element extends from the front cavity surface.

13. The container latching and locking assembly of claim 9 wherein the latch and lock device comprises:

a cam lock shaft engaging the lock hasp, the cam lock shaft deployable in the latching position and the unlatching position;

a lock actuator engaging the cam lock shaft, the lock actuator configured to lock the cam lock shaft in the latching position in a locked configuration and unlock the cam lock shaft in an unlocked configuration of the lock actuator; and a lock actuator interface interfacing with the lock actuator, the lock actuator interface configured to facilitate selective release of the lock actuator from the locked configuration to the unlocked configuration.

14. The container latching and locking assembly of claim 13 wherein the lock actuator comprises a lock actuator knob engaging the cam lock shaft for selective rotation of the cam lock shaft between the latching position and the unlatching position in the unlocked configuration of the lock actuator.

15. The container latching and locking assembly of claim 13 wherein the lock actuator interface comprises at least one biometric lock actuator interface.

16. The container latching and locking assembly of claim 15 wherein the at least one biometric lock actuator interface comprises at least one of the following: a facial image scan interface, a fingerprint scan interface and an iris scan interface.

17. A container latching and locking assembly suitable for mounting on a container having a container base, a container handle on the container base and a container lid selectively closeable and openable on the container base, the container latching and locking assembly comprising:

a latch unit comprising:

a latch unit body configured for attachment to the container lid of the container, the latch unit body comprising:

a lower body surface;

an upper body surface opposite the lower body surface;

a front body surface configured to be oriented away from the container lid of the container;

a rear body surface configured to be oriented toward the container lid of the container;

a latch cavity formed in and opening to the lower body surface and the rear body surface; and a latch element in the latch cavity;

a lock unit comprising:

a lock unit housing configured for attachment to the container base of the container, the lock unit housing comprising:

a lower housing portion;

an upper housing portion opposite the lower housing portion, the upper housing portion normally adjacent to the latch unit body of the latch unit;

a rear housing portion and a front housing portion spaced-apart and parallel to each other and extending from the lower housing portion to the upper housing portion, the rear housing portion configured to be oriented toward the container base and the front housing portion configured to be oriented away from the container base of the container;

a pair of spaced-apart side housing portions extending from the lower housing portion to the upper housing portion between the rear housing portion and the front housing portion;

a rear housing surface on the rear housing portion;

a handle channel in the rear housing surface, the handle channel sized and configured to receive and accommodate the container handle on the container base of the container, the handle channel having a pair of handle channel ends opening at the pair of spaced-apart side housing portions, respectively, of the lock unit housing of the lock unit;

a housing interior in the lock unit housing; and a hasp slot in the upper housing portion, the hasp slot communicating with the housing interior and normally disposed in registration or alignment with the latch cavity in the latch unit body of the latch unit; and a latch and lock device in the housing interior of the lock unit housing, the latch and lock device comprising:

a lock hasp extending from the housing interior through the hasp slot and terminating in the latch cavity, the latch and lock device selectively configurable in a latching position wherein the lock hasp engages the latch element and an unlatching position wherein the lock hasp disengages the latch element;

a cam lock shaft engaging the lock hasp, the cam lock shaft deployable in the latching position and the unlatching position;

a lock actuator engaging the cam lock shaft, the lock actuator configured to lock the cam lock shaft in the latching position in a locked configuration and unlock the cam lock shaft in an unlocked configuration of the lock actuator;

a biometric lock actuator interface interfacing with the lock actuator, the biometric lock actuator interface configured to facilitate selective release and unlocking of the lock actuator; and the lock actuator comprising a lock actuator knob on the front housing portion of the lock unit housing, the lock actuator knob engaging the cam lock shaft for selective rotation of the cam lock shaft between the latching position and the unlatching position in the unlocked configuration of the lock actuator, the biometric lock actuator interface comprising a fingerprint scan interface having a fingerprint sensor on the lock actuator knob;

at least one latch unit fastener configured to attach the latch unit body of the latch unit to the container lid of the container;

at least one lock unit fastener configured to attach the lock unit housing of the lock unit to the container base of the container; and wherein at least one of the at least one latch unit fastener and the at least one lock unit fastener comprises at least one bolt, at least one bracket, interfacing slide flanges, at least one rivet or any combination thereof.

18. The container latching and locking assembly of claim 17 wherein the latch cavity comprises a front cavity surface recessed from and parallel to the rear body surface of the latch unit body, and wherein the latch element extends from the front cavity surface.

19. The container latching and locking assembly of claim 17 wherein the at least one latch unit fastener comprises the at least one bolt, at least one bracket, interfacing slide flanges, at least one rivet or any combination thereof.

20. The container latching and locking assembly of claim 17 wherein the at least one lock unit fastener comprises the at least one bolt, at least one bracket, interfacing slide flanges, at least one rivet or any combination thereof.

* * * * *